Patented Apr. 22, 1941

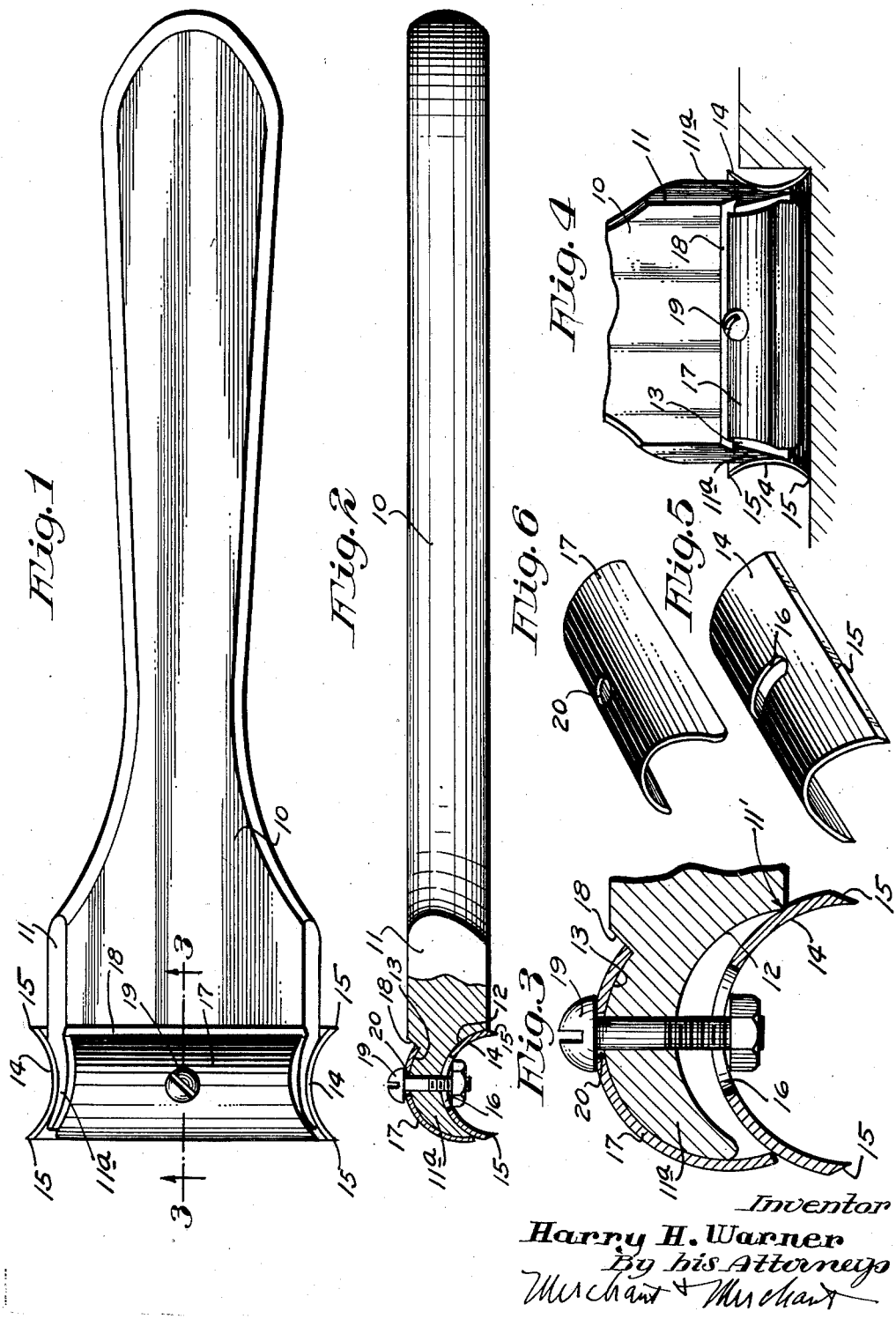

2,238,957

UNITED STATES PATENT OFFICE 2,238,957

SCRAPER

Harry H. Warner, Minneapolis, Minn.

Application April 15, 1939, Serial No. 268,134

2 Claims. (Cl. 30—171)

My invention provides an extremely simple and highly efficient scraper, adapted for many different uses, but particularly is designed for floor scraping, removing paint and the like; and to the above ends generally stated, the invention consists of a novel device, combination of novel devices and arrangement of parts hereinafter described and defined in the claims.

The improved device comprises a handle or body member, a scraper blade and a blade reinforcing plate or abutment. The scraper blade, which is preferably of tempered steel, is in the form of a concavo-convex cylindrical element that is fitted into a seat in the end of the handle. The blade reinforcing element or plate is also a concavo-convex approximately cylindrical metal sheet.

The clamping means is such that when the blade is clamped tight to the handle, that portion thereof that is adjacent to its cutting edge, will be tightly pressed against the projecting edge of the reinforcing plate, and the latter will act as an abutment to prevent chattering of the scraper blade.

The handle is formed with a concave seat for the scraper blade which is of such relative size or curve that when the scraper blade is tightly clamped to its seat, its cutting edge will be held tightly against the projecting edge of the reinforcing plate and the latter will act as an abutment to the scraper blade.

A commercial form of the improved scraper is illustrated in the accompanying drawing wherein like characters indicate like parts throughout the several views.

Referring to the drawing:

Fig. 1 is a plan view of the improved scraper;

Fig. 2 is a side elevation of the scraper with some parts broken away and some parts in vertical section;

Fig. 3 is a large section taken on the line 3—3 of Fig. 1;

Fig. 4 is a front elevation looking at the scraper at a downward angle of about 45°, some parts of the scraper handle being broken away;

Fig. 5 is a perspective showing the scraper blade; and

Fig. 6 is a perspective showing the reinforcing plate or abutment.

The handle 10, which is preferably made of wood, is formed with a wide front end affording a head 11 that is wider than the body of the handle and is formed with a concave blade seat 12, and with an over-lying convex blade seat 13, which latter fits the interior of the reinforcing plate. The scraper blade 14, which as stated is concavo-convex and cylindrical, is bevelled at both edges to form sharp cutting edges 15. At its central portion the blade 14 is formed with a slot or bolt passage 16 that extends circumferentially of the blade.

The reinforcing plate 17 is seated on the convex bearing surface 13 with one edge engaged against the stop shoulder 18 formed on the head of the handle. The other edge of the plate 17 projects beyond the surface 13 and slightly into a curve that would be formed by a continuation of the concave seat 12, which latter noted feature is important as will presently appear.

The cylindrical curve of the scraper blade 14 is normally somewhat greater than the curve of the seat 12, or at any rate is so differently formed that when the blade 14 is first applied as shown in Fig. 3, it will engage the projecting edge of the reinforcing plate or abutment 17 at one side and at its other side will engage an abutment-acting angle 11' of the head 11.

To clamp the scraper blade in working position as shown in Figs. 1 and 2, a nut-equipped bolt 19 is preferably employed. This bolt is passed freely through a perforation 20 in the plate 17, through a perforation in the approximately crescent shaped or curved portion of the head 11 and through the slot 16 in the scraper blade 14. When the nut on the bolt 19 is fully tightened, the scraper blade will be slightly contracted and drawn into close engagement with the seat 12, but will be kept in contact with the projecting abutment-acting portion of the plate 17. When the parts are adjusted as shown in Figs. 1, 2 and 4, the scraper is ready for use. By edgewise adjustments, the scraper blade can be set with just the right projection beyond the abutment-acting plate, and it may, from time to time, be readjusted to compensate for wear by resharpening of the blade.

Moreover, the scraper blade can be reversed edge for edge when worn, thereby increasing its working life two-fold over a one edge scraper.

It is further important to note that the sides of the head 11 and the ends of the scraper blade and of the abutment plate 17 are bevelled so that the extreme ends of the cutting edge of the scraper may be brought clear up into rectangular corners in the scraping action. It has already been indicated that that portion of the head 11 that is between the blade 14 and plate 17 in section longitudinally of the scraper end is approximately crescent shaped. This crescent shaped portion is marked with the character 11a, and is an important feature in bringing the scraper blade and abutment-acting or reinforcing plate into proper working correlation.

When the scraper blade is firmly clamped in working position as best shown in Fig. 2, its cutting edge will be firmly held against spring action so that "chattering" of the scraper blade in the scraping action will be prevented. The reinforcing plate also permits the scraper blade to be made of lighter sheet metal than would be otherwise required.

It is further important to note that the curvature of the scraper blade 14 is such that when it is forced to its seat, as shown in Fig. 2, and as previously described, it will be contracted slightly in diameter, and the pressure then produced against the projecting end of the reinforcing plate 17 will keep the upper edge of the latter pressed tightly against stop shoulder 18 so that said plate 17 will not shift even if there should be a slippage between the same and the head of the clamping bolt 19.

The device described, in actual practice, has been found highly efficient for the purpose had in view. While capable of a wide range of uses, it has been found that it is particularly serviceable for scraping wood, painted or varnished surfaces.

It will also be understood that the preferred form of the scraper described is capable of certain modifications within the scope of the invention herein described and claimed.

What I claim is:

1. In a scraper, a handle having a head portion which in section longitudinally of the handle is approximately crescent-shaped, the concave and convex surfaces of which intersect at the extended end of the crescent, a concavo-convex cylindrical scraper seated in the concave surface of said crescent, a concavo-convex reinforcing plate seated on the convex surface of said crescent with a projecting edge engaging the extended portion of said scraper blade, and clamping means rigidly connecting said scraper blade and reinforcing plate to said crescent.

2. In a scraper, a handle having a head portion which in section longitudinally of the handle is approximately crescent-shaped, the concave and convex surfaces of which intersect at the extended end of the crescent, a concavo-convex cylindrical scraper seated in the concave surface of said crescent, a concavo-convex reinforcing plate seated on the convex surface of said crescent with a projecting edge engaging the extended portion of said scraper blade, and clamping means rigidly connecting said scraper blade and reinforcing plate to said crescent, said head having a stop shoulder engageable with the rear edge of said reinforcing plate to limit the backward movement thereof.

HARRY H. WARNER.